(12) United States Patent
Cerutti-Maori et al.

(10) Patent No.: US 6,674,571 B2
(45) Date of Patent: Jan. 6, 2004

(54) OPTICAL ARCHITECTURE FOR AN OBSERVATION TELESCOPE, IN PARTICULAR A TELESCOPE FOR OBSERVING THE EARTH FROM A SATELLITE

(75) Inventors: Guy Henri Abel Cerutti-Maori, Cannes la Bocca (FR); Thierry Viard, Les Villas de Mandelieu (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/015,883

(22) Filed: Dec. 17, 2001

(65) Prior Publication Data

US 2002/0080476 A1 Jun. 27, 2002

(30) Foreign Application Priority Data

Dec. 22, 2000 (FR) ............................................. 00 16938

(51) Int. Cl.[7] ............................................. G02B 17/00
(52) U.S. Cl. ....................... 359/365; 359/366; 359/727; 359/728; 359/857
(58) Field of Search ................................ 359/364, 399, 359/726, 727, 728, 868, 869, 365, 366, 407

(56) References Cited

U.S. PATENT DOCUMENTS

| | | | |
|---|---|---|---|
| 3,667,827 A | | 6/1972 | Monari |
| 5,287,218 A | * | 2/1994 | Chen ............................ 359/365 |
| 5,323,263 A | * | 6/1994 | Schoenmakers ............. 359/366 |
| 5,379,157 A | | 1/1995 | Wang |
| 5,689,376 A | * | 11/1997 | Lewis ........................... 359/717 |
| 5,748,365 A | * | 5/1998 | Chen ............................ 359/366 |
| 5,907,442 A | | 5/1999 | Matsuda |

FOREIGN PATENT DOCUMENTS

| | | |
|---|---|---|
| EP | 0565355 A2 | 10/1993 |
| GB | 1322333 | 7/1973 |
| GB | 2283107 A | 4/1995 |

* cited by examiner

*Primary Examiner*—Thong Nguyen
*Assistant Examiner*—Arnel C. Lavarias
(74) *Attorney, Agent, or Firm*—Sughrue Mion, PLLC

(57) ABSTRACT

An optical architecture for observation telescopes, in particular for telescopes intended to be installed on board a vehicle, such as a space satellite, for observing terrestrial areas, includes a concave and off-axis mirror which is aspherical or possibly spherical and reflects in the form of a convergent beam a beam consisting of radiation that it receives from a terrestrial area that it is observing, a dioptric and achromatic aperture correction plate inserted on the path of the convergent beam reflected by the mirror, a dioptric and achromatic field correction plate inserted on the path of the convergent beam reflected by the mirror on the downstream side of the aperture correction plate relative to the mirror, and a pupil on the path of the reflected convergent beam to obtain an off-axis field of view preventing central obscuration. It constitutes a simple way of imaging stereoscopically.

14 Claims, 3 Drawing Sheets

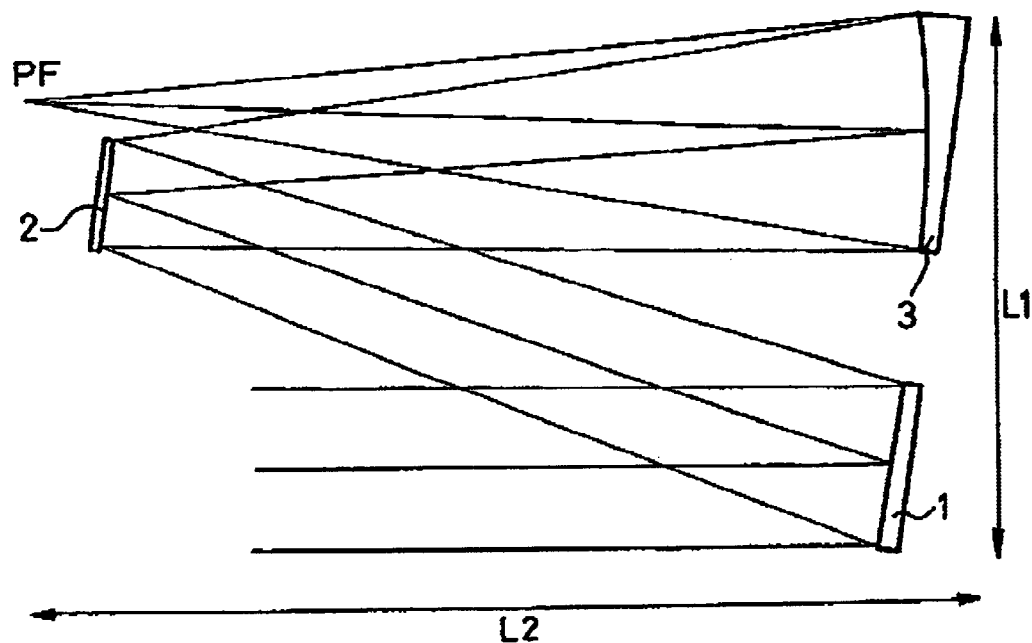
FIG_1 PRIOR ART
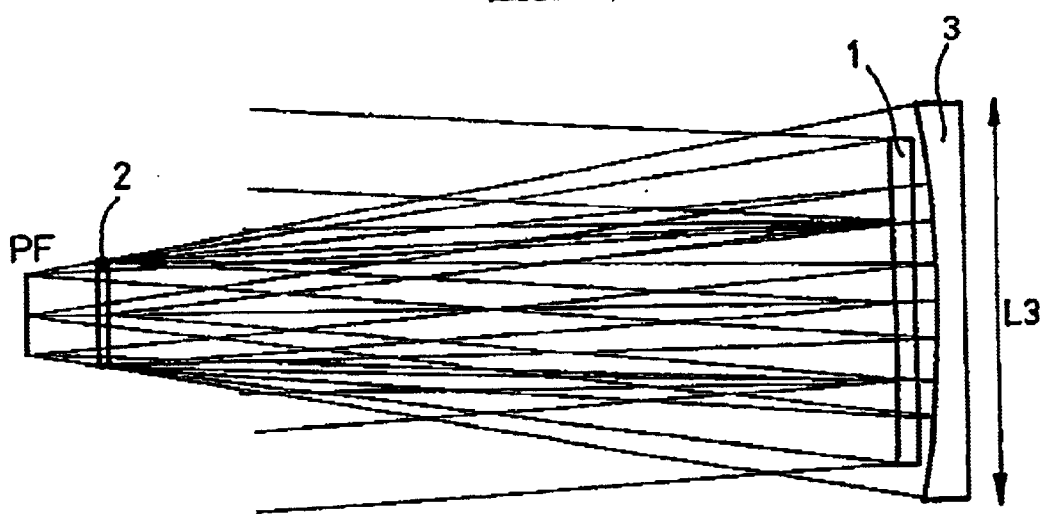
FIG_2 PRIOR ART

FIG_3
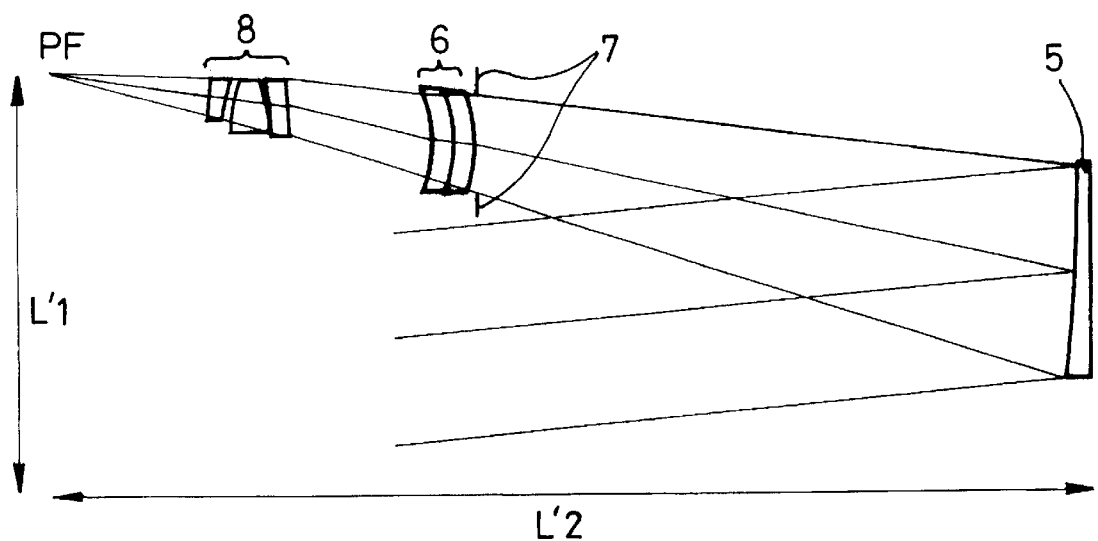
FIG_4
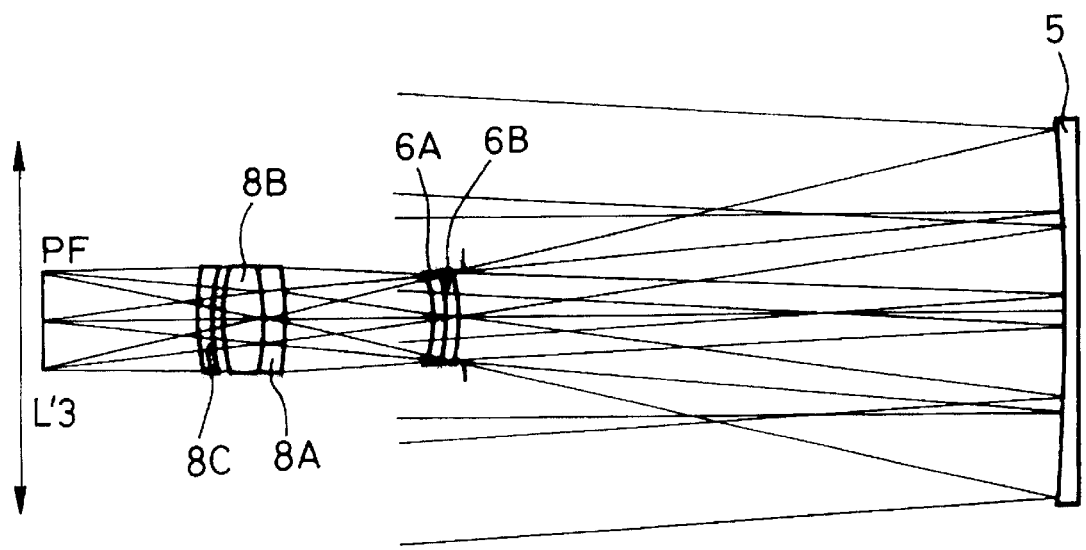

FIG_5
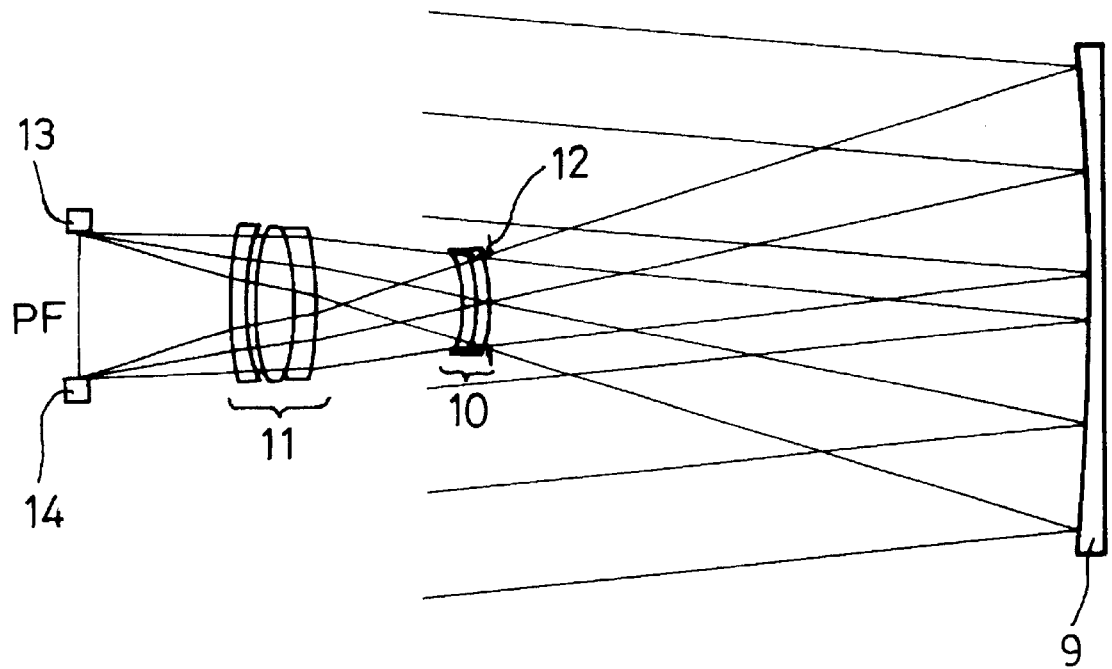

OPTICAL ARCHITECTURE FOR AN OBSERVATION TELESCOPE, IN PARTICULAR A TELESCOPE FOR OBSERVING THE EARTH FROM A SATELLITE

CROSS-REFERENCE TO RELATED APPLICATIONS

This application is based on French Patent Application No. 00 16 938 filed Dec. 22, 2000, the disclosure of which is hereby incorporated by reference thereto in its entirety, and the priority of which is hereby claimed under 35 U.S.C. §119.

BACKGROUND OF THE INVENTION

1. Field of the Invention

The invention relates to an optical architecture for a wide-angle observation telescope, in particular a telescope intended to be installed on board a vehicle. That vehicle is a space satellite, for example, using the telescope to observe terrestrial areas, as in the SPOT observation program, for example.

2. Description of the Prior Art

As is known to the person skilled in the art, current requirements in terms of observation from a satellite imply a spatial observation resolution over an area of a few meters within a field of the order of 40 to 60 kilometers, for example. There is also a requirement for the telescope to have no central obscuration, such as exists with some prior art telescope architectures.

These requirements in terms of observation and absence of obscuration can be met by three-mirror anastigmats (TMA). FIGS. 1 and 2 show an appropriate prior art architecture for TMA telescopes. The telescope includes an off-axis, aspherical and concave first mirror 1 which therefore has no symmetry of revolution and reflects the beam toward a second mirror 2 so that it converges slightly, as can be seen in FIGS. 1 and 2. The mirror 2 is an aspherical, convex and off-axis mirror, unless it is located at the pupil of the telescope, in which case it is obtained from a deformed spherical shape. The beam that it receives is reflected in the form of a divergent beam toward an aspherical, concave and off-axis third mirror 3, as also shown in the two figures referred to above. The mirror 3 receives the divergent beam reflected by the mirror 2 and focuses it in an off-axis focal plane PF. The system formed of the three mirrors 1, 2 and 3 constitutes an anastigmatic optical imaging system in which the image field is off-axis. This kind of system is bulky with dimensions L1, L2 and L3 (see FIGS. 1 and 2) respectively equal to 550 mm, 900 mm and 400 mm, for example, for a telescope with a 160 mm pupil and a focal length of 610 mm.

This kind of TMA telescope has a number of disadvantages. It implies the production of at least two concave, aspherical and off-axis mirrors, and these are costly because they have an elongate shape and are difficult and time-consuming to produce. The assembly obtained is heavy, which is an undoubted disadvantage in the case of equipment intended to be used on board a space satellite. Also, the optical architecture defined for the telescope is sensitive to eccentricity.

SUMMARY OF THE INVENTION

The invention therefore proposes an optical architecture for observation telescopes, in particular for telescopes intended to be installed on board a vehicle, such as a space satellite, for observing terrestrial areas, which architecture includes:

a concave and off-axis mirror which is aspherical or possibly spherical and reflects in the form of a convergent beam a beam consisting of radiation that it receives from a terrestrial area that it is observing, a dioptric and achromatic aperture correction plate inserted on the path of the convergent beam reflected by the mirror, a dioptric and achromatic field correction plate inserted on the path of the convergent beam reflected by the mirror on the downstream side of the aperture correction plate relative to the mirror, and a pupil on the path of the reflected convergent beam to obtain an off-axis field of view preventing central obscuration.

In a variant of the invention, the optical architecture of the telescope includes:

a concave and off-axis mirror which is aspherical or possibly spherical and produces two images with a particular angular separation and which reflects as a convergent beam each of the two beams consisting of radiation that it receives from a terrestrial area that it is observing, a dioptric and achromatic aperture correction plate inserted on the path of the convergent beams reflected by the mirror, a dioptric and achromatic field correction plate inserted on the path of the convergent beams reflected by the mirror on the downstream side of the aperture correction plate relative to the mirror, and a pupil on the path of the reflected convergent beams to obtain two fields of preventing central obscuration, the pupil being adapted to accommodate simultaneously two sighting directions each corresponding to one of the reflected beams.

In one embodiment common to both architectures according to the invention the pupil is on a front face of the aperture correction plate which receives the convergent beam or beams reflected by the mirror.

The aperture correction plate and the field correction plate are achromatic and without power or virtually without power.

The aperture correction plate and the field correction plate are each respectively made up of lenses of at least two different types of glass.

The indices of the glasses of at least one of the correction plates can be chosen to take into account variations caused by temperature.

One embodiment of the invention includes a focussing mechanism operating on the lenses of the field correction plate.

One embodiment of the invention includes an auxiliary operating on the beam, such as a beam splitter, with dichroic prisms and divolis (optical line dividers), enabling the beam to be split spectrally, an image derotator, or a splitter plate for dividing the beam to obtain images in different focal planes.

The invention, its features and its advantages are explained in the following description, which is given with reference to the accompanying drawings.

BRIEF DESCRIPTION OF THE DRAWINGS

FIGS. 1 and 2 are views of the prior art TMA telescope briefly referred to hereinabove in a plane YZ and in a plane XZ, respectively.

FIGS. 3 and 4 are views of a telescope according to the invention in a plane YZ and in a plane XZ, respectively.

FIG. 5 is a view of an embodiment of a telescope according to the invention for stereo applications.

DETAILED DESCRIPTION OF THE PREFERRED EMBODIMENTS

The observation telescope optical architecture shown in FIGS. 3 and 4 is intended to be substituted for that shown in FIGS. 1 and 2.

To this end, the telescope according to the invention includes a concave and off-axis first mirror 5, which is aspherical or possibly spherical and reflects as a convergent beam the beam consisting of the radiation that it receives from a terrestrial area that it is observing. The second and third mirrors of a TMA telescope are here replaced by dioptric correction plates which are corrected for chromatic aberration. To this end, an aperture correction plate 6 which is dioptric, achromatic and without power or virtually without power is inserted on the path of the convergent beam reflected by the mirror 5. This correction plate consists of at least two lenses 6A, 6B made of different types of glass to correct chromatic aberration. Glasses such as SCHOTT FK52 and LaK8 glasses can be used, for example. The pupil 7 of the telescope is preferably on the front face of the aperture correction plate 6 which receives the convergent beam reflected by the mirror 5. Central obscuration is avoided by a judicious choice of the sighting direction, in other words the field of view.

A field correction plate 8 which is dioptric, achromatic and without power or virtually without power is inserted on the path of the convergent beam reflected by the mirror 5, on the downstream side of the aperture correction plate 7 relative to the mirror 5. The field correction plate 8 also consists of lenses made of at least two different types of glass to correct chromatic aberration, FIGS. 3 and 4 showing three lenses 8A, 8B, 8C made of different types of glass. The respective indices of the glasses can be chosen to take into account variations caused by temperature.

The optical architecture obtained has the advantage of facilitating implantation of a mirror for changing the sighting direction. It also has the advantage of facilitating alignment of the components of the telescope consisting of the mirror and the correction plates. It provides simple focussing, employing a mechanism for moving the lenses of the field correction plate. Alignment is facilitated by the fact that the telescope has a common axis.

It also enables the use of auxiliaries that can operate on the beam, in accordance with the intended applications, for example to associate with the telescope a beam splitter, a derotator, a splitter plate, etc.

The beam splitter uses dichroic prisms and divolis (optical line dividers) to split a received beam into spectral domains, for example. The derotator enables image rotation, for example so that images successively obtained while moving, and thus in particular while moving in orbit, are maintained in the same direction, allowing for the speed of the vehicle carrying the telescope. The splitter plate can be used to split the flux that it receives, for example to obtain images in two different focal planes.

The dimensions L'1, L'2 and L'3 shown in FIGS. 3 and 4 for a telescope with a 160 mm pupil and a focal length of 610 mm can be 300 mm, 800 mm and 300 mm, respectively.

A significant reduction in the overall size of the telescope is therefore obtained, in particular laterally, and the mass of the telescope is of course lower than before, because the lenses used with the first and only mirror are much lighter than the two mirrors of the TMA telescope they replace. The reduced dimensions and simplified optical architecture inherently generate less stray light than a TMA telescope and facilitate the provision of baffles to protect against spurious signals. The proposed optical architecture produces a telescope that is less sensitive to eccentricity than a TMA telescope.

In one embodiment of the invention, the telescope optical architecture described above can be used to obtain stereoscopic images.

The telescope in accordance with this embodiment of the invention then includes a concave and off-axis mirror 9 which is aspherical or possibly spherical and whose shape approximates that of an elongate ellipse, enabling two images to be obtained with a particular angular separation, for example of the order of six degrees, depending on the mission. An aperture correction plate 10 and a field correction plate 11 are associated with the mirror 9. The two correction plates are dioptric and achromatic correction plates and each is made up of lenses made of at least two different types of glass. The correction plates are without power or virtually without power and their disposition relative to the mirror 9 corresponds to that of the correction plates 6 and 8 relative to the mirror 5 described above. The pupil 12 of the telescope is preferably on the front face of the aperture correction plate 10 which receives the convergent beam reflected by the mirror 9; it also has an oblong shape to allow accommodate two sighting directions simultaneously, as shown in FIG. 5. Two images are obtained simultaneously by the same telescope, each having the same focal length and the same types of defect, and they consequently have the same scale factor. The aperture correction plate 10, the field correction plate 11 and the pupil 12 are common to the two sighting directions. Two receiver strips or matrices 13 and 14 disposed perpendicularly to the plane of FIG. 5 recover the two images obtained simultaneously in the focal plane PF.

There is claimed:

1. An optical architecture for observation telescopes, comprising:

a concave and off-axis mirror which is aspherical or spherical and reflects in the form of a convergent beam received radiation;

a dioptric and achromatic aperture correction plate inserted on a path of the convergent beam reflected by said mirror;

a dioptric and achromatic field correction plate inserted on said path of said convergent beam reflected by said mirror on the downstream side of said aperture correction plate relative to said mirror, and a pupil on the path of said reflected convergent beam to obtain an off-axis field of view preventing central obscuration.

2. An optical architecture for observation telescopes comprising:

a concave and off-axis mirror which is aspherical or spherical and produces two images with an angular separation therebetween and which reflects as two convergent beams received radiation;

a dioptric and achromatic aperture correction plate inserted on the path of the two convergent beams reflected by said mirror, a dioptric and achromatic field correction plate inserted on said path of said two convergent beams reflected by said mirror on the downstream side of said aperture correction plate relative to said mirror, and a pupil on the path of said two convergent beams to obtain two fields of preventing central obscuration, said pupil accommodating simultaneously two sighting directions each corresponding to one of said two convergent beams.

3. The telescope optical architecture claimed in claim 1 wherein said pupil is on a front face of said aperture correction plate which receives said convergent beam or beams reflected by said mirror.

4. The telescope optical architecture claimed in claim 2 wherein said pupil is on a front face of said aperture correction plate which receives said convergent beam or beams reflected by said mirror.

5. The telescope optical architecture claimed in claim 1 wherein said aperture correction plate and said field correction plate are athermic and without power or virtually without power.

6. The telescope optical architecture claimed in claim 2 wherein said aperture correction plate and said field correction plate are athermic and without power or virtually without power.

7. The telescope optical architecture claimed in claim 1 wherein said aperture correction plate and/or said field correction plate are each respectively made up of lenses of at least two different types of glass.

8. The telescope optical architecture claimed in claim 2 wherein said aperture correction plate and/or said field correction plate are each respectively made up of lenses of at least two different types of glass.

9. The telescope optical architecture claimed in claim 7 wherein the indices of said glasses of at least one of said correction plates are chosen to take into account variations caused by temperature.

10. The telescope optical architecture claimed in claim 8 wherein the indices of said glasses of at least one of said correction plates are chosen to take into account variations caused by temperature.

11. The telescope optical architecture claimed in claim 9 including a focussing mechanism operating on said lenses of said field correction plate.

12. The telescope optical architecture claimed in claim 10 including a focussing mechanism operating on said lenses of said field correction plate.

13. The telescope optical architecture claimed in claim 11 including an auxiliary operating on said beam, such as a beam splitter, with dichroic prisms and divolis (optical line dividers), enabling said beam to be split spectrally, an image derotator, or a splitter plate for dividing said beam to obtain images in different focal planes.

14. The telescope optical architecture claimed in claim 12 including an auxiliary operating on said beam, such as a beam splitter, with dichroic prisms and divolis (optical line dividers), enabling said beam to be split spectrally, an image derotator, or a splitter plate for dividing said beam to obtain images in different focal planes.

* * * * *